(12) United States Patent
Hain

(10) Patent No.: US 11,577,668 B2
(45) Date of Patent: Feb. 14, 2023

(54) INTERIOR COMPONENT, MOTOR VEHICLE AND METHOD FOR PRODUCING AN INTERIOR COMPONENT

(71) Applicant: Bayerische Motoren Werke Aktiengesellschaft, Munich (DE)

(72) Inventor: Roland Hain, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 183 days.

(21) Appl. No.: 16/967,839

(22) PCT Filed: Jan. 14, 2019

(86) PCT No.: PCT/EP2019/050736
§ 371 (c)(1),
(2) Date: Aug. 6, 2020

(87) PCT Pub. No.: WO2019/154589
PCT Pub. Date: Aug. 15, 2019

(65) Prior Publication Data
US 2021/0394689 A1 Dec. 23, 2021

(30) Foreign Application Priority Data

Feb. 7, 2018 (DE) ..................... 10 2018 201 851.0

(51) Int. Cl.
*B60R 13/02* (2006.01)
*B62D 65/14* (2006.01)

(52) U.S. Cl.
CPC .......... *B60R 13/0256* (2013.01); *B62D 65/14* (2013.01)

(58) Field of Classification Search
CPC ............ B60R 13/0256; B60R 13/0268; B60R 13/0262; B60R 13/02; B62D 65/14
See application file for complete search history.

(56) References Cited

U.S. PATENT DOCUMENTS

| 5,885,662 A | 3/1999 | Gardner, Jr. |
| 2013/0034692 A1 | 2/2013 | Fujii et al. |
| 2017/0113630 A1 | 4/2017 | Rottmann |

FOREIGN PATENT DOCUMENTS

| DE | 100 54 490 A1 | 5/2002 | |
| DE | 697 17 501 T2 | 4/2004 | |
| DE | 10 2012 015 277 A1 | 2/2013 | |
| DE | 202013001276 U1 * | 4/2013 | ............. B60K 37/04 |

(Continued)

OTHER PUBLICATIONS

International Search Report (PCT/ISA/210) issued in PCT Application No. PCT/EP2019/050736 dated Feb. 20, 2019 with English translation (five (5) pages).

(Continued)

*Primary Examiner* — Lori L Lyjak
(74) *Attorney, Agent, or Firm* — Crowell & Moring LLP

(57) ABSTRACT

An interior component for a motor vehicle covers a region of the motor vehicle. The interior component has a main body with a visible surface, wherein the visible surface has a first surface region and a second surface region. The first surface region is formed as a high-gloss region and the first surface region and the second surface region are formed on the same side of the interior component. The second surface region is provided in the form of a light scattering region.

20 Claims, 3 Drawing Sheets

(56) References Cited

FOREIGN PATENT DOCUMENTS

| DE | 10 2015 016 498 A1 | 6/2017 | | |
|---|---|---|---|---|
| DE | 10 2018 201 851 A1 | 8/2019 | | |
| EP | 2 684 744 A1 | 1/2014 | | |
| EP | 2930003 A1 | * 10/2015 | ......... | B29C 45/0001 |
| WO | WO 2016/001167 A1 | 1/2016 | | |
| WO | WO-2016094378 A1 | * 6/2016 | ............... | B44C 1/00 |

OTHER PUBLICATIONS

German-language Written Opinion (PCT/ISA/237) issued in PCT Application No. PCT/EP2019/050736 dated Feb. 20, 2019 (seven (7) pages).

Third Party Observations issued in German Application No. 10 2018 201 851.0 dated Jul. 3, 2020 (14 pages).

German-language Search Report issued in German Application No. 102018201851.0 dated Oct. 21, 2020 with partial English translation (12 pages).

\* cited by examiner

INTERIOR COMPONENT, MOTOR VEHICLE AND METHOD FOR PRODUCING AN INTERIOR COMPONENT

BACKGROUND AND SUMMARY OF THE INVENTION

The present invention relates to an interior component for a motor vehicle, for covering a region of the motor vehicle. The invention further relates to a motor vehicle having an interior component and a method for producing the interior component for the motor vehicle.

In motor vehicles, it is known to cover regions in an interior of the motor vehicle by means of a multiplicity of differently formed interior components. By means of such a covering, for example regions of a body of the motor vehicle, cables, hoses, plugs or the like can be covered. Thus, these regions are protected against external influences, such as water, dust, mechanical actions or the like. In addition, internal components can offer a visual enhancement, since the view of some functional elements of the motor vehicle may not be desired for aesthetic reasons. For this reason, interior components are often designed to be opaque and non-transparent.

A further visual aspect in interior components is the styling of a visible surface on a visible side of the interior component, that is to say a surface of a side which, when installed, faces a vehicle compartment of the motor vehicle. For example, visible surfaces of interior components having a wooden material, metal, leather, carbon appearance or the like are known. In addition, the visible surfaces can be made to be matt or glossy.

In particular in sporty motor vehicles, interior components having a high-gloss visible surface are increasingly requested. Such visible surfaces are distinguished by the fact that, as opposed to matt visible surfaces, they have a particularly high reflectance and thus have a particularly highly pronounced mirror effect. This is not a problem in some regions of the visible surface and can lead to desired visual effects. In other regions of the visible surface, high-gloss visible surfaces can have a disadvantageous secondary effect, in that, for example, display elements, in particular display lights, or light from contour or surface illumination can be reflected from these regions toward a driver of the motor vehicle. In this case, the driver perceives a duplication of the display element. This perception is often felt to be disruptive and can therefore have a detrimental effect on the concentration and the driving experience of the driver. Furthermore, regions of the visible surface can reflect objects outside the motor vehicle, such as trees, light sources or the like, toward the driver and thus likewise disturb or at least irritate the driver. Often, it is not possible to shield such regions by means of appropriately formed screens.

It is therefore an object of the present invention to at least partly remedy the disadvantages described above in an interior component and a motor vehicle having an interior component. In particular, it is an object of the present invention to devise an interior component and a motor vehicle which, in a simple and economical way, avoid undesired reflections on interior components in the interior of a motor vehicle. In addition, it is the object of the invention to devise a method for producing such an interior component which, in a simple and economical way, permits the production of an interior component according to the invention.

This and other objects are achieved by an interior component for a motor vehicle, for covering a region of the motor vehicle, by a motor vehicle having the interior component, and by a method for producing the interior component, according to the claimed invention. Features and details which are described in conjunction with the interior component according to the invention of course also apply in conjunction with the motor vehicle according to the invention and the method according to the invention and vice versa, so that, with respect to the disclosure relating to the individual aspects of the invention, reference is or can always be made reciprocally.

According to the first aspect of the invention, the object is achieved by an interior component for a motor vehicle, for covering a region of the motor vehicle. The interior component has a main body with a visible surface, wherein the visible surface has a first surface region and a second surface region. The first surface region is formed as a high-gloss region. In addition, the first surface region and the second surface region are formed on the same side of the interior component. According to the invention, the second surface region forms a light-scattering region for scattering light beams.

The main body of the interior component is preferably plate-like or substantially plate-like. Within the context of the invention, a plate-like formation is understood to mean a formation of a component, the width and/or height of which is substantially greater than the component thickness thereof. The main body preferably has bulges and/or angles or the like. The main body can have virtually any desired contour. The main body has substantially two sides, namely a visible side and an installation side. The visible side faces a passenger compartment of the motor vehicle in the intended installed state of the interior component. The installation side faces away from the vehicle compartment in the intended installed state of the interior component and, for example, faces a body or a door of the motor vehicle.

The visible surface is formed on the visible side of the main body. The visible surface accordingly faces the passenger compartment in the installed state of the interior component and is visible to occupants, in particular the driver, of the motor vehicle. The visible surface has a first surface region and a second surface region. Preferably, the proportion of the first surface region on the visible surface is at least 50%, further preferably at least 70% and particularly preferably at least 85%.

The first surface region is formed as a high-gloss region. This means that the interior component is highly glossy in the first surface region, such as, for example, highly reflective or highly mirroring. Light beams striking the first surface region at an angle of incidence are accordingly substantially reflected at an angle of reflection of which the magnitude corresponds to the angle of incidence and barely absorbed, so that in this way particularly intense light reflections are effected on the first surface region. A reflectance of the first surface for light waves is preferably between 50% and 100%, particularly preferably between 70% and 100%.

According to the invention, the second surface region is formed as a light scattering region for scattering light beams. This means that the interior component is formed in the second surface region in such a way that light beams striking the second surface region are scattered or at least refracted. The second surface region is preferably not or only very weakly mirroring. Light beams striking the second surface region are accordingly substantially not reflected in accordance with the first surface region but are substantially absorbed and/or highly scattered and/or in particular differently refracted, so that in this way no or only very weakly detectable light reflections are effected on the second surface region. Preferably, the reflectance of the second surface for light waves is between 0% and 50%, particularly preferably between 0% and 30%. Furthermore, it is preferred that the reflectance of the second surface is at least 20 percentage points, preferably at least 30 percentage points, less than the reflectance of the first surface.

As compared with conventional interior components, an interior component according to the invention has the advantage that, by means of a specific arrangement of the second surface region, undesired reflections on the interior component can be avoided or at least significantly reduced. Irritation of the driver because of undesired reflections can be reduced highly in this way. In addition, because of the formation of the first surface region and the proportion of the first surface region in the visible surface, the interior component substantially has a highly glossy appearance.

According to a further development of the invention, provision can be made in an interior component for the first surface region to amount to between 55% and 99% of the visible surface of the main body. Particularly preferably, the first surface region amounts to between 75% and 90% of the visible surface of the main body. Thus, an appearance of the visible surface of the interior component is substantially imparted by the first surface region, so the visible surface is substantially perceived to be highly glossy. A detrimental effect on the highly glossy appearance of the visible surface is only slightly affected by a comparatively low surface proportion of the second surface region on the visible surface.

Preferably, the second surface region has a micro structure. Within the context of the invention, a micro structure is understood to mean a structure which cannot be resolved as a micro structure by the human eye or only when observed very closely. The micro structure has, for example, dot-shaped and/or rectangular, in particular square, and/or linear and/or wavy elevations and/or depressions. The micro structure is preferably formed regularly. A regular formation is understood to mean a formation which is at least partly repeated, so that the micro structure is perceived visually as a uniform surface, at least for an occupant of the motor vehicle. A micro structure can be produced economically and cost-neutrally in fabrication with a one-time expenditure on tool creation. In addition, a surface appearing to be matt can be effected by means of a micro structure.

In a preferred refinement of the invention, the visible surface has a third surface region, wherein the third surface region is arranged between the first surface region and the second surface region. The third surface region is less glossy or more matt than the first surface region and less matt or more glossy than the second surface region. The third surface region can also be designated as a transition region and has a visible surface finish which lies between the visual surface finishes of the first surface region and the second surface region. The third surface region is preferably formed in a graduated manner, so that the surface finish of the third surface region changes from the first surface region to the second surface region. Preferably, the third surface region becomes more glossy toward the first surface region. The third surface region preferably has a micro structure which is weaker than the micro structure of the second surface region. According to the invention, a weaker formation is understood to mean a lower height and depth of structural elements of the micro structure and/or a greater spacing of the structural elements. The third surface region has the advantage that it effects a visually more harmonious transition between the first surface region and the second surface region.

According to the invention, it is particularly preferable for the visible surface of the main body to have a paint layer. The paint layer preferably has colored pigments in order to cover the visible surface. According to the invention, provision can be made for the paint layer to be transparent, in order not to conceal the visible surface. Here, the paint layer has a clear lacquer or is formed from a clear lacquer. The paint layer is preferably arranged uniformly on the visible surface and has a smooth surface. A paint layer has the advantage that the interior component has a higher visual value and resistance to external influences, such as, for example, moisture, dust, sunbeams, chemical or mechanical stresses or the like.

Preferably, the interior component is formed as an instrument carrier to receive display elements. Within the context of the invention, these also include decorative panels, in which the display elements are integrated or adjoin the same. An instrument carrier preferably has one or more cutouts to receive display elements and/or operating elements of the motor vehicle. Here, the second surfaces are preferably arranged in a way corresponding to the cutouts, in order that visual influences of the displays or operating elements to be received which, in the installed state in a motor vehicle, can be seen by a driver of the motor vehicle, are eliminated or at least substantially reduced.

According to the second aspect of the invention, the object is achieved by a motor vehicle. The motor vehicle has a driver's seat and at least one interior component for covering a region of the motor vehicle. According to the invention, the interior component is formed according to an interior component according to the invention.

Apart from the interior component according to the invention, the motor vehicle according to the invention is preferably formed according to a conventional motor vehicle. Preferably, the motor vehicle has a body, wherein the interior component is arranged within the body and preferably covers a sub-region of the body. Further preferably, the motor vehicle has a vehicle door, wherein the interior component preferably covers a sub-region of the vehicle door.

In the motor vehicle described, all the advantages result which have already been described in relation to an interior component for a motor vehicle, for covering a region of the motor vehicle according to the first aspect of the invention. Accordingly, as compared with conventional motor vehicles, the motor vehicle according to the invention has the advantage that, as a result of a specific arrangement of the second surface region of the interior component, undesired reflections on the interior component can be avoided or at least significantly reduced. Irritation of the driver or of the passenger because of undesired reflections can be highly reduced in this way in a motor vehicle according to the invention. In addition, the interior component of the motor vehicle substantially has a highly glossy appearance because of the formation of the first surface region and of the proportion of the first surface region on the visible surface.

According to the invention, it is preferred for at least a first sub-region of the second surface region to be arranged within the motor vehicle in such a way that a light beam striking the first sub-region of the second surface region from outside through a window of the motor vehicle would be reflected in the direction of a headrest of the driver's seat or a region of an eye of a driver if the second surface region were to be formed as a high-gloss region. As a result of forming the second surface region as a light-scattering region, such a light beam is not reflected or reflected only very weakly in the direction of the headrest of the driver's seat, so that the driver is not irritated thereby. This has the advantage that driving comfort for a driver of the motor vehicle is improved with simple means and economically.

Further preferably, in a motor vehicle according to the invention, provision can be made for at least a second sub-region of the second surface region to be arranged within the motor vehicle in such a way that a light beam emitted from a display lamp of the motor vehicle and striking the second sub-region of the second surface region would be reflected in the direction of a headrest of the driver's seat if the second surface region were to be formed as a high-gloss region. As a result of forming the second surface region as a light scattering region, such a light beam is not reflected or reflected only very weakly in the direction of the headrest of the driver's seat, so that the driver is not irritated thereby. This likewise has the advantage that driving comfort for a driver of the motor vehicle is improved with simple means and economically.

According to the third aspect of the invention, the object is achieved by a method for producing an interior component of a motor vehicle, for covering a region of the motor vehicle. The method comprises the following steps:

providing a closed injection mold having a cavity for producing the interior component according to the invention, wherein the cavity has a first internal surface for producing the first surface and a second internal surface for producing the second surface, injecting a plasticized injection-molding material into the cavity, curing the injection-molding material, opening the injection mold, and removing the interior component (1) from the injection mold.

The cavity of the injection mold provided is formed as a negative of the interior component. The cavity has an internal wall having at least the first internal surface and the second internal surface. Thus, the first surface and the second surface in the interior component can already be produced by the injection-molding process. Preferably, the injection mold is designed to produce the third surface. Complicated reworking of the interior component, for example by means of a laser or the like, to produce a micro structure is accordingly no longer required. The method according to the invention permits the production of an interior component according to the invention in a simple way and economically, since a negative of the micro structure has to be introduced only once into the mold during the production of the same, and thus the finished injection moldings automatically have the micro structure.

In the method described, all the advantages result which have already been described in relation to an interior component for a motor vehicle, for covering a region of the motor vehicle according to the first aspect of the invention, and in relation to a motor vehicle according to the second aspect of the invention. Accordingly, as compared with conventional methods for producing an interior component, the method according to the invention has the advantage that with simple means it is possible to produce an interior component by means of which, by a specific arrangement of the second surface regions, undesired reflections on the interior component are avoided or at least significantly reduced. In this way, irritation of the driver because of undesired reflections of the interior component can be reduced sharply. In addition, by means of the method it is possible to produce an interior component which, because of the formation of the first surface region and the proportion of the first surface region on the visible surface, substantially has a highly glossy appearance.

An interior component according to the invention for a motor vehicle, for covering a region of the motor vehicle, a motor vehicle according to the invention and a method according to the invention will be explained in more detail below by using drawings.

Figure 1:
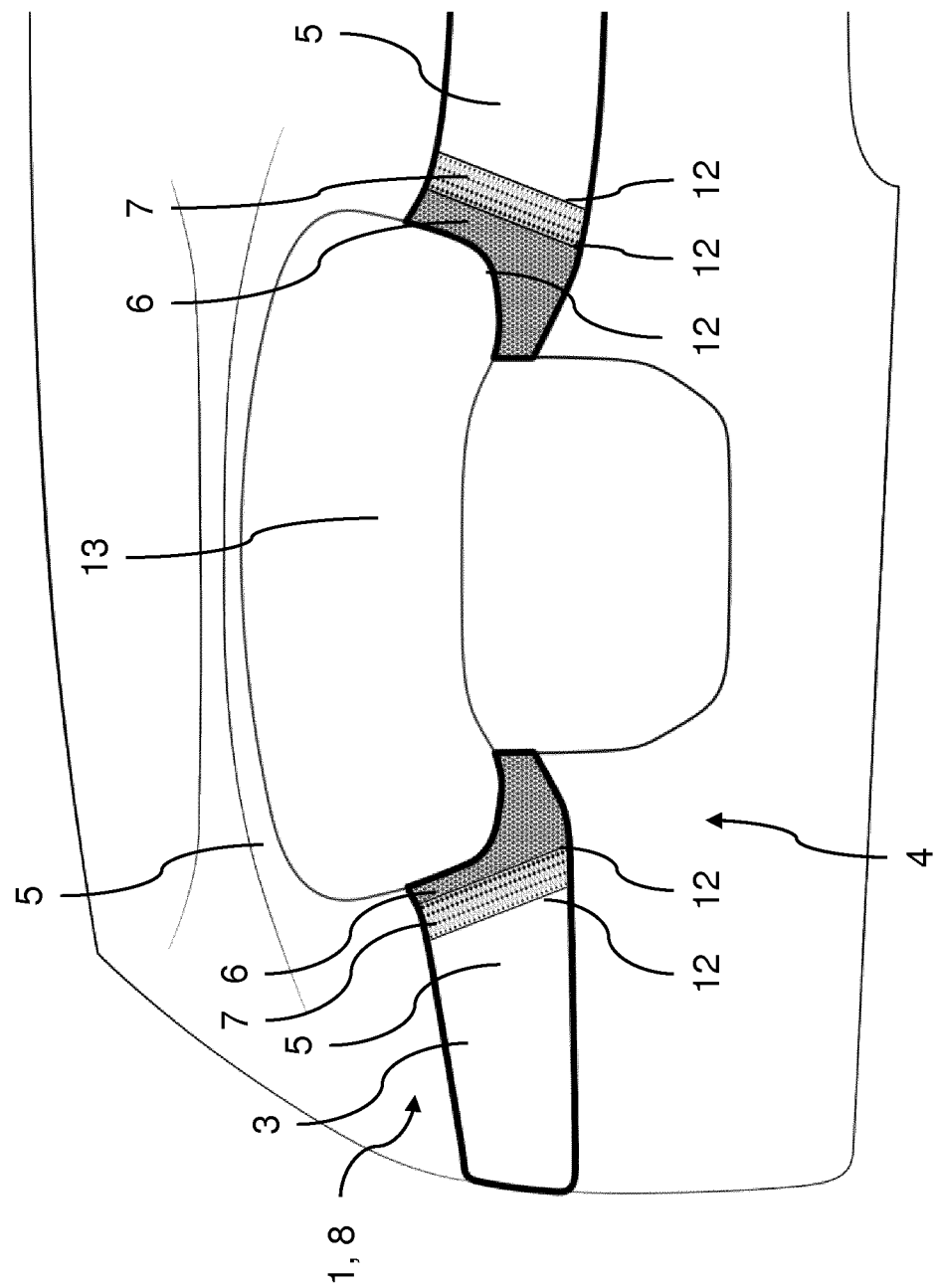
FIG. 1 shows schematically a preferred embodiment of an interior component according to the invention in a driver's view.
Figure 2:
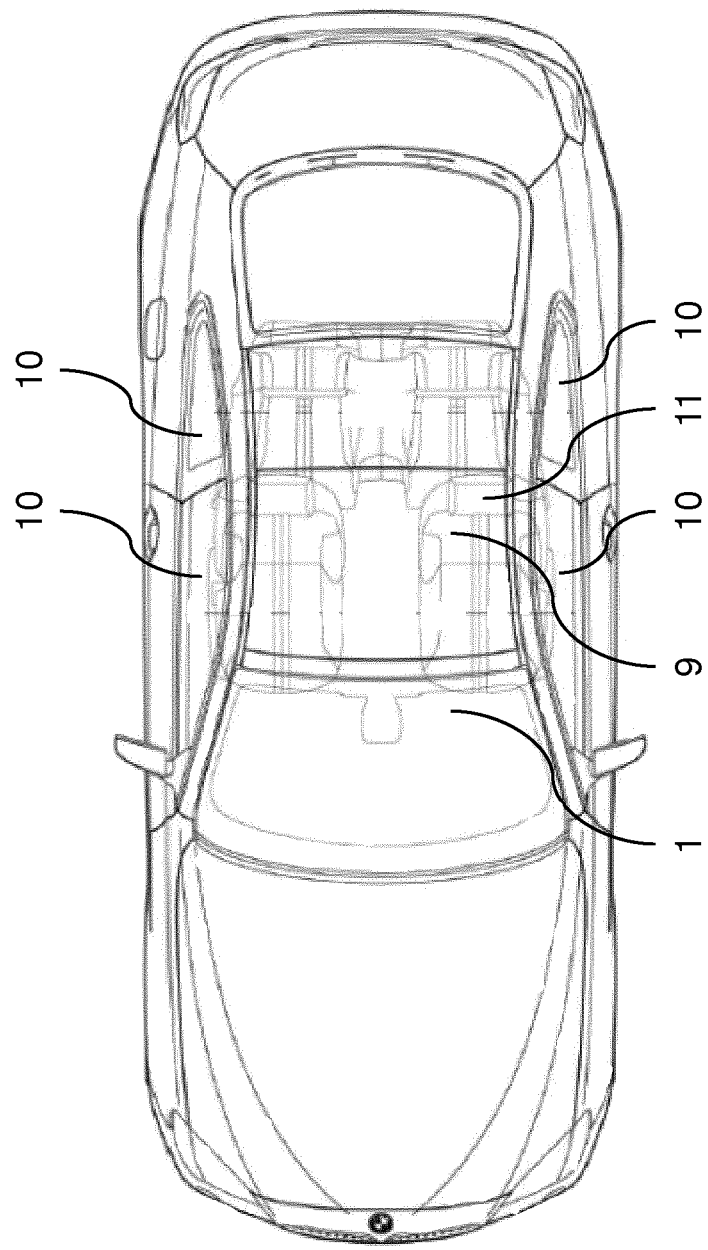
FIG. 2 shows a schematic plan view of a preferred embodiment of the motor vehicle according to the invention.
Figure 3:
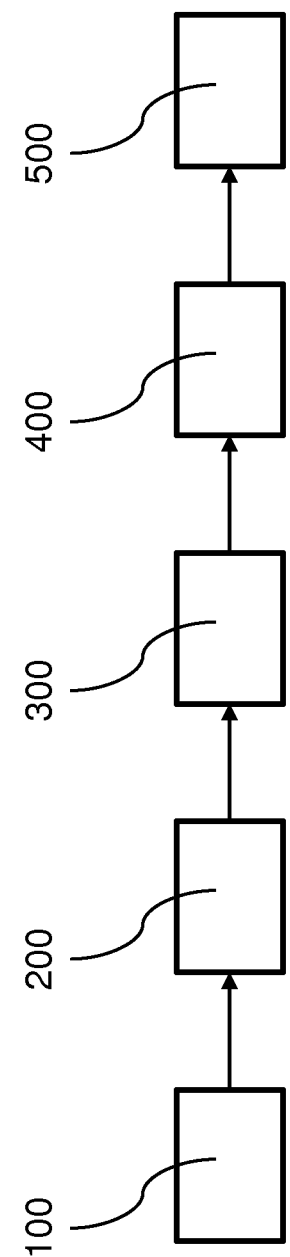
FIG. 3 is a flowchart of the method according to the invention.

Elements having the same function and action are provided with the same designations in FIGS. 1 to 3.

DETAILED DESCRIPTION OF THE DRAWINGS

A preferred embodiment of an interior component 1 according to the invention for a motor vehicle 2 (cf FIG. 2) is illustrated schematically in a driver's view in FIG. 1. The interior component 1 has a plate-like main body 3 with an elongated extent. The main body has a plurality of bulges 12. On a visible surface 4, shown in this view, of a visible side of the interior component 1, three first surface regions 5, two second surface regions 6, and two third surface regions 7 are formed, wherein the third surface regions 7 are each arranged between a first surface region 5 and a second surface region 6. The first surface regions 5 are formed as high-gloss regions, so that light beams striking the first surface regions 5 at an angle of incidence are substantially reflected at an angle of reflection having a corresponding magnitude. The second surface regions 6 are formed as light scattering regions, so that incident light beams are substantially absorbed and/or scattered by the second surface regions 6. Thus, no or at least substantially fewer light reflections occur on the second surface regions 6 than on the first surface regions 5. The third surface regions 7 are less glossy than the first surface regions 5 and more glossy than the second surface regions 6. The main body 3 has a cutout 13 for receiving a display element, not illustrated, of the motor vehicle 2.

A preferred embodiment of a motor vehicle 2 according to the invention is depicted schematically in a plan view in FIG. 2. The motor vehicle 2 has an interior component 1 according to the invention in a front section. In addition, the motor vehicle 2 has a driver's seat 9 with a headrest 11 and multiple windows 10.

A method according to the invention is illustrated schematically in a flowchart in FIG. 3. In a first method step 100, a closed injection mold having a cavity for producing the interior component 1 according to the invention is provided. The cavity has a first interior surface for producing the first surface 5 and a second interior surface for producing the second surface 6 and, if appropriate, a third interior surface for producing the third surface 7. In a second method step 200, plasticized injection-molding material is injected into the cavity. In a third method step 300, the injection molding material is cured, cooled and crystallized. In a fourth method step 400, the injection mold is opened. In a fifth method step 500, the interior component 1 is removed from the injection mold.

LIST OF DESIGNATIONS

1 Interior component
2 Motor vehicle
3 Main body
4 Visible surface
5 First surface region
6 Second surface region
7 Third surface region
8 Instrument carrier
9 Driver's seat
10 Window
11 Headrest
12 Bulge
13 Cutout
100 First method step
200 Second method step
300 Third method step
400 Fourth method step
500 Fifth method step

The invention claimed is:

1. An interior component for covering a region of a motor vehicle, comprising:
a main body with a visible surface, wherein
the visible surface has a first surface region and a second surface region,
the first surface region is formed as a high-gloss region,
the first surface region and the second surface region are formed on a same side of the interior component,
the second surface region is formed as a light-scattering region for scattering light beams, and wherein
the first surface region has an area that is greater than an area of the second surface region.

2. The interior component according to claim 1, wherein the first surface region amounts to between 55% and 95% of the visible surface of the main body.

3. The interior component according to claim 1, wherein the second surface region has a micro structure.

4. The interior component according to claim 1, wherein the visible surface has a third surface region,
the third surface region is arranged between the first surface region and the second surface region, and
the third surface region is less glossy than the first surface region and is less matt than the second surface region.

5. The interior component according to claim 1, wherein the visible surface of the main body has at least one paint layer.

6. The interior component according to claim 1, wherein the interior component is formed as an instrument carrier to receive display elements.

7. The interior component according to claim 2, wherein the visible surface has a third surface region,
the third surface region is arranged between the first surface region and the second surface region, and
the third surface region is less glossy than the first surface region and is less matt than the second surface region.

8. The interior component according to claim 2, wherein the visible surface of the main body has at least one paint layer.

9. The interior component according to claim 4, wherein the visible surface of the main body has at least one paint layer.

10. A motor vehicle, comprising:
a driver's seat; and
at least one interior component according to claim 1, wherein the interior component covers a region of the motor vehicle.

11. The motor vehicle according to claim 10, wherein at least a first sub-region of the second surface region is arranged within the motor vehicle such that a light beam striking the first sub-region of the second surface region from outside through a window of the motor vehicle would be reflected in the direction of a headrest of the driver's seat if the second surface region were to be formed as a high-gloss region.

12. The motor vehicle according to claim 11, wherein at least a second sub-region of the second surface region is arranged within the motor vehicle such that a light beam emitted from a display lamp of the motor vehicle and striking the second sub-region of the second surface region would be reflected in the direction of the headrest of the driver's seat if the second surface region were to be formed as a high-gloss region.

13. The motor vehicle according to claim 10, wherein at least a second sub-region of the second surface region is arranged within the motor vehicle such that a light beam emitted from a display lamp of the motor vehicle and striking the second sub-region of the second surface region would be reflected in the direction of the headrest of the driver's seat if the second surface region were to be formed as a high-gloss region.

14. A method for producing an interior component of a motor vehicle, for covering a region of the motor vehicle, the method comprising the steps of:
providing a closed injection mold having a cavity for producing the interior component comprising:
a main body with a visible surface, wherein
the visible surface has a first surface region and a second surface region,
the first surface region is formed as a high-gloss region,
the first surface region and the second surface region are formed on a same side of the interior component, and
the second surface region is formed as a light-scattering region for scattering light beams, wherein
the cavity of the mold has a first internal surface for producing the first surface and a second internal surface for producing the second surface;
injecting a plasticized injection-molding material into the cavity;
curing the injection-molding material;
opening the injection mold; and
removing the interior component from the injection mold.

15. An interior component for covering a region of a motor vehicle, comprising:
a main body with a visible surface, wherein
the visible surface has a first surface region and a second surface region,
the first surface region is formed as a high-gloss region,
the first surface region and the second surface region are formed on a same side of the interior component,
the second surface region is formed as a light-scattering region for scattering light beams, wherein
the visible surface has a third surface region, wherein
the third surface region is arranged between the first surface region and the second surface region, and wherein
the third surface region is less glossy than the first surface region and is less matt than the second surface region.

16. The interior component according to claim 15, wherein
   the visible surface of the main body has at least one paint layer.

17. The interior component according to claim 15, wherein
   the first surface region amounts to between 55% and 95% of the visible surface of the main body.

18. The interior component according to claim 15, wherein
   the second surface region has a micro structure.

19. The interior component according to claim 5, wherein the first surface region is located on a flat, plate-like portion of the visible surface, and wherein the second surface region is located on a bulge of the visible surface.

20. The interior component according to claim 15, wherein the first surface region is located on a flat, plate-like portion of the visible surface, and wherein the second surface region is located on a bulge of the visible surface.

* * * * *